(12) United States Patent
Jeong et al.

(10) Patent No.: US 12,309,691 B2
(45) Date of Patent: May 20, 2025

(54) METHOD AND DEVICE FOR MANAGEMENT AND ACCESS CONTROL OF NETWORK SLICE IN WIRELESS COMMUNICATION SYSTEM

(71) Applicant: SAMSUNG ELECTRONICS CO., LTD., Suwon-si (KR)

(72) Inventors: Sangsoo Jeong, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 17/753,691

(22) PCT Filed: Sep. 18, 2020

(86) PCT No.: PCT/KR2020/012652
§ 371 (c)(1),
(2) Date: Mar. 11, 2022

(87) PCT Pub. No.: WO2021/054781
PCT Pub. Date: Mar. 25, 2021

(65) Prior Publication Data
US 2022/0345996 A1     Oct. 27, 2022

(30) Foreign Application Priority Data
Sep. 20, 2019 (KR) .................. 10-2019-0116405

(51) Int. Cl.
*H04W 48/18* (2009.01)
*H04W 24/02* (2009.01)
(Continued)

(52) U.S. Cl.
CPC ........... *H04W 48/18* (2013.01); *H04W 24/02* (2013.01); *H04W 28/0268* (2013.01); *H04W 48/16* (2013.01); *H04W 88/18* (2013.01)

(58) Field of Classification Search
CPC . H04W 24/02; H04W 28/0268; H04W 48/16; H04W 48/18; H04W 88/14; H04W 88/18
See application file for complete search history.

(56) References Cited

U.S. PATENT DOCUMENTS

| 10,687,275 B2 | 6/2020 | Lee et al. |
| 11,206,611 B2 | 12/2021 | Lee et al. |

(Continued)

FOREIGN PATENT DOCUMENTS

| CN | 109951877 A | 6/2019 |
| KR | 10-2019-0018297 A | 2/2019 |

(Continued)

OTHER PUBLICATIONS

International Search Report and Written Opinion of the International Searching Authority in connection with International Application No. PCT/KR2020/012652 issued Dec. 17, 2020, 9 pages.

(Continued)

*Primary Examiner* — Kashif Siddiqui

(57) ABSTRACT

Disclosed are a method and a device for controlling access in a wireless communication system and, particularly, to a method and a device for management and access control of a network (NW) slice in a wireless communication system. According to one embodiment of the disclosure, a method by which a first NW function (NF #1) device of a wireless communication system manages an NW slice comprises the steps of: receiving an NW slice selection assist information (NSSAI) availability update message from at least one second network function (NF #2) device included in a NW slice; storing information included in the NSSAI availability update message; transmitting, to the NF #2, a response message to the NSSAI availability update message; and transmitting, to the NF #2, a message that requests changed information when a state or a configuration is changed to the (Continued)

NF #2, wherein the NSSAI availability update message can include the capacity parameters of the NW slice.

15 Claims, 12 Drawing Sheets

(51) Int. Cl.
　　*H04W 28/02*　　(2009.01)
　　*H04W 48/16*　　(2009.01)
　　*H04W 88/18*　　(2009.01)

(56) References Cited

U.S. PATENT DOCUMENTS

| | | | |
|---|---|---|---|
| 2019/0230556 A1* | 7/2019 | Lee | H04W 28/16 |
| 2019/0335392 A1* | 10/2019 | Qiao | H04W 48/16 |
| 2020/0112868 A1* | 4/2020 | Shariat | H04W 48/06 |
| 2020/0228968 A1 | 7/2020 | Bernardos et al. | |
| 2020/0322879 A1* | 10/2020 | Zhu | H04W 60/00 |

FOREIGN PATENT DOCUMENTS

| | | |
|---|---|---|
| KR | 10-2020-0143134 A | 12/2020 |
| WO | 2019/036494 A1 | 2/2019 |

OTHER PUBLICATIONS

3GPP TS 29.531 V15.4.0 (Jun. 2019) Technical Specification; 3rd Generation Partnership Project; Technical Specification Group Core Network and Terminals; 5G System; Network Slice Selection Services; Stage 3; (Release 15); 51 pages.

3GPP TS 23.502 V16.1.0 (Jun. 2019) Technical Specification; 3rd Generation Partnership Project; Technical Specification Group Services and System Aspects; Procedures for the 5G System; Stage 2; (Release 16); 499 pages.

European Patent Office, "Supplementary European Search Report," dated Sep. 20, 2022, in connection with European Patent Application No. 20866235.3, 13 pages.

Ericsson et al., "OI#4g: Update Capability service provided by NSSF," S2-179500, SA WG2 Meeting #124, 2 pages.

\* cited by examiner

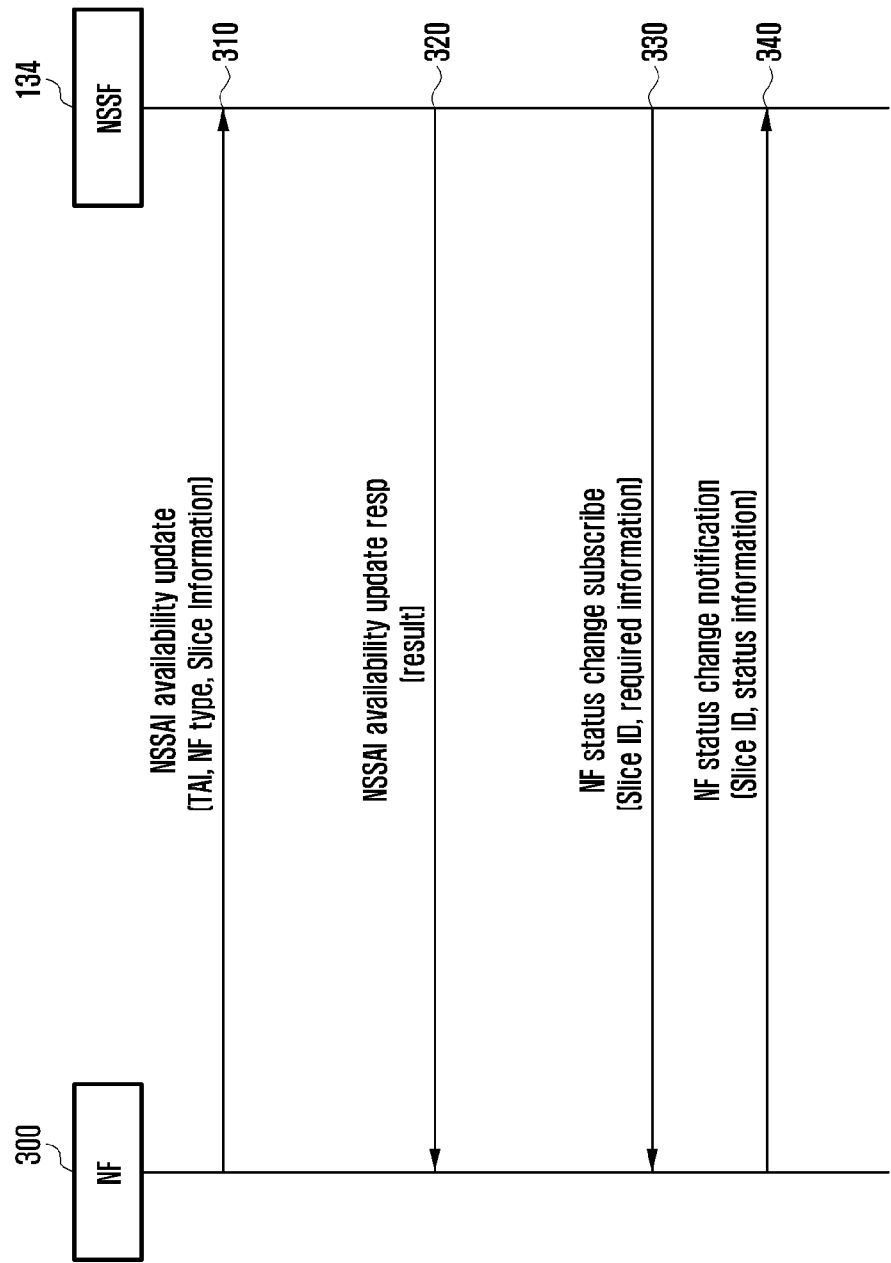

FIG. 4A

| Attribute name | Data type | Cardinality | Description |
|---|---|---|---|
| tai | Tai | 1 | This IE shall contain the identifier of the Tracking Area |
| NF Type | nf-type | 1 | This IE contains the type of the consumer NF. |
| supportedSnssaiList | array(Snssai) | 1..N | This IE shall contain the S-NSSAI(s) supported by the NF. If TAI is included, this information is valid for the TA. |
| supportedSnassiCapacity | array(SliceCapacity) | 1..N | This IE shall contain the capacity of each corresponding S-NSSAI. |

FIG. 4B

| Attribute name | Data type | Cardinality | Description |
|---|---|---|---|
| maxUEs | Integer | 1 | This IE containsthe maximum number of UEs supported by the slice at the same time. |
| maxSessions | Integer | 1 | This IE contains the maximum number of Sessions supported by the slice at the same time. |
| maxIPFlows | Integer | 1 | This IE contains the maximum number of IP flows supported by the slice at the same time. |
| maxQoSFlows | Integer | 1 | This IE contains the maximum number of QoS flows supported by the slice at the same time. |
| maxGBRFlows | Integer | 1 | This IE contains the maximum number of GBR flows supported by the slice at the same time. |

FIG. 4C

| Attribute name | Data type | Cardinality | Description |
|---|---|---|---|
| Tai | Tai | 1 | This IE contains the identifier of the Tracking Area |
| NF Type | nf-type | 1 | This IE contains the type of the consumer NF. |
| supportedSliceInfoList | array(SliceInfo) | 1..N | This IE contains the slice information supported by the NF. If TAI is included, this information is valid for the TA. |

FIG. 4D

| Attribute name | Data type | Cardinality | Description |
|---|---|---|---|
| supportedSlice | Snssai | 1 | This IE contains the identifier of the Tracking Area |
| supportedSliceCapacity | SliceCapacity | 1 | This IE indicates the capacity of the slice. Several parameters can be included. |

FIG. 4E

| Attribute name | Data type | Cardinality | Description |
|---|---|---|---|
| maxUEs | Integer | 1 | This IE contains the maximum number of UEs supported by the slice at the same time. |
| maxSessions | Integer | 1 | This IE contains the maximum number of Sessions supported by the slice at the same time. |
| maxIPFlows | Integer | 1 | This IE contains the maximum number of IP flows supported by the slice at the same time. |
| maxQoSFlows | Integer | 1 | This IE contains the maximum number of QoS flows supported by the slice at the same time. |
| maxGBRFlows | Integer | 1 | This IE contains the maximum number of GBR flows supported by the slice at the same time. |

METHOD AND DEVICE FOR MANAGEMENT AND ACCESS CONTROL OF NETWORK SLICE IN WIRELESS COMMUNICATION SYSTEM

CROSS-REFERENCE TO RELATED APPLICATIONS

This application is a 371 of International Application No. PCT/KR2020/012652, filed Sep. 18, 2020, which claims priority to Korean Patent Application No. 10-2019-0116405, filed Sep. 20, 2019, the disclosures of which are herein incorporated by reference in their entirety.

BACKGROUND

1. Field

The disclosure relates to a method and apparatus for access control in a wireless communication system and, more particularly, to a method and apparatus for network slice management and access control in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a beyond 4G network communication system or a post long term evolution (post LTE) system.

The 5G communication system is considered to be implemented in higher frequency (mmWave) bands (e.g., 60 GHz bands) so as to accomplish higher data rates. To decrease propagation loss of radio waves and increase a transmission distance, the beamforming, massive multiple-input multiple-output (MIMO), full dimensional MIMO (FD-MIMO), array antenna, an analog beamforming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the development of various information technology (IT) technologies, network equipment has evolved into a network function (NF) virtualized by applying virtualization technology, and such virtualized NFs are implemented in a software form beyond physical limitations, thus being installed/operated in various types of clouds or data centers (DCs). In particular, the NF may be freely expanded/reduced (scaling), installed (initiation), or ended (termination), depending on service requirements, system capacity, or network load. Even if these NFs are implemented in the form of software, a physical constitution is not excluded because they have to be basically driven in the physical constitution, for example, certain equipment. Also, it is possible to implement the NFs with a simple physical constitution, that is, only hardware. Therefore, because of having a physical component, each NF may also be referred to as an "NF device".

In order to support various services in various network structures, a network slicing technology has been introduced. Network slicing is a technology that logically constructs a network as a set of network functions (NFs) so as to support a specific service and separates it from other slices. One terminal may access two or more slices when receiving various services.

SUMMARY

Although a network slicing technique has been introduced in various forms of wireless communication networks, a specific plan to allocate network resources by using the network slicing technique is not provided.

The disclosure provides a method and apparatus for managing a network slice in a wireless communication system and accessing the network slice.

The disclosure provides a method and apparatus for selecting a network slice in a wireless communication system.

The disclosure provides a procedure for accessing and selecting a network slice in a wireless communication system.

According to an embodiment of the disclosure, a method for managing a network slice at a first network function (NF #1) device in a wireless communication system includes receiving a network slice selection assistance information (NSSAI) availability update message from at least one second network function (NF #2) device included in the network (NW) slice; storing information contained in the NSSAI availability update message; transmitting, to the NF #2, a response message to the NSSAI availability update message; and transmitting, to the NF #2, a message that requests changed information from the NF #2 when a status or a configuration is changed.

The NSSAI availability update message may contain a capacity parameter of the NW slice.

According to an embodiment of the disclosure, a first network function (NE #1) device for managing a network slice in a wireless communication system includes a network interface communicating with other network function devices in the wireless communication system; a memory storing information about the network slice; and at least one processor.

The at least one processor is configured to:
receive, through the network interface, a network slice selection assistance information (NSSAI) availability update message from at least one second network function (NF #2) device included in the network (NW) slice, store, in the memory, information contained in the NSSAI availability update message, transmit, to the NF #2 through the network interface, a response message to the NSSAI availability update message, and transmit, to the NF #2 through the network interface, a message that requests changed information from the NF #2 when a status or a configuration is changed.

The NSSAI availability update message may contain a capacity parameter of the NW slice.

According to the disclosure, it is possible to access a network slice, select the network slice, and thus achieve manage smooth network slice management in a wireless communication system.

BRIEF DESCRIPTION OF DRAWINGS

FIG. 3 is a signal flow diagram illustrating an operation of performing access control for each network slice according to various embodiments of the disclosure.

FIGS. 4A to 4E are diagrams illustrating information contained in a message transmitted by an NF 300 according to various embodiments of the disclosure.

BRIEF DESCRIPTION OF THE DRAWINGS

Figure 1:
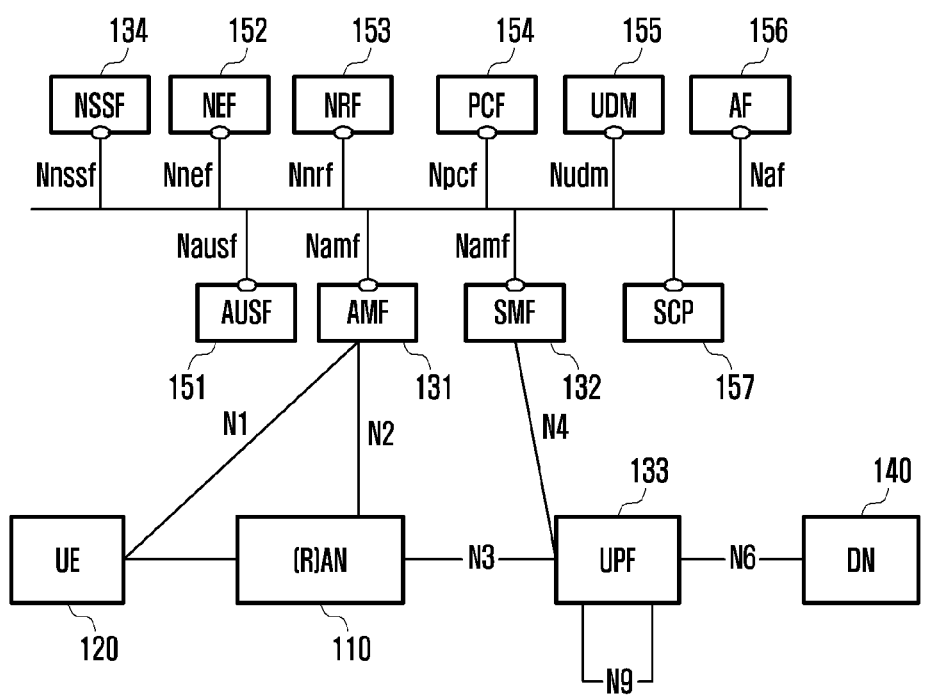
FIG. 1 illustrates a wireless communication system according to various embodiments of the disclosure.

Terms in the disclosure are used merely to describe a specific embodiment and may not be intended to limit the scope of other embodiments. The singular expressions may include plural expressions unless the context clearly dictates otherwise. Terms used herein, including technical or scientific terms, may have the same meaning as commonly understood by those skilled in the art. Among terms used herein, some terms defined in a normal dictionary may be interpreted as having the same or similar meaning as the contextual meanings in the related art and are not to be construed as an ideal or overly formal sense unless expressly defined to the contrary herein. In some cases, the terms defined herein cannot be construed to exclude embodiments of the disclosure.

In various embodiments of the disclosure described hereinafter, a hardware approach will be exemplarily used for description. However, because various embodiments of the disclosure include a technology using both hardware and software, the various embodiments of the disclosure do not exclude a software-based approach.

The disclosure relates to a method and apparatus for supporting various services in a wireless communication system. Specifically, the disclosure describes a technology for supporting various services by supporting mobility of a user equipment (UE) in a wireless communication system.

In the following description, terms for identifying access nodes, terms referring to network entities or network functions (NFs), terms referring to messages, terms referring to interfaces between network objects, terms referring to various kinds of identification information, etc. are exemplified for convenience of description. Therefore, the disclosure is not limited to the terms described below, and other terms having equivalent technical meanings may be used.

Hereinafter, for convenience of description, the disclosure uses terms and names defined in the 3rd generation partnership project long term evolution (3GPP LTE) and 5G standards. However, the disclosure is not limited by such terms and names and may be equally applied to systems conforming to other standards.

In the following, objects that exchange information for access control and state management will be collectively referred to as an NF. The NF may include, for example, an access and mobility management function (hereinafter, AMF) device, a session management function (hereinafter, SMF) device, and a network slice selection function (hereinafter, NSSF) device. However, embodiments of the disclosure can be equally applied even when the NF is actually implemented as an instance (Instance, i.e., an AMF instance, an SMF instance, an NSSF instance, etc.).

In the disclosure, the term 'instance' may mean that a specific NF exists in the form of software code and, in order to perform the function of the NF in a physical computing system (e.g., a specific computing system existing on the core network), is in an executable state by being allocated physical and/or logical resources from the computing system. Therefore, the AMF instance, the SMF instance, and the NSSF instance may mean that, for AMF, SMF, and NSSF operations, physical and/or logical resources are allocated from a specific computing system existing on the core network and thus become usable. As a result, the AMF instance, the SMF instance, and the NSSF instance that are allocated physical and/or logical resources for AMF operation, SMF operation, and NSSF operation from a specific computing system existing on the network can perform the same operations as a physical AMF device, a physical SMF device, and a physical NSSF device, respectively. Therefore, in embodiments of the disclosure, items described as an NF (e.g., AMF, SMF, UPF, NSSF, NRF, SCP, etc.) device may be replaced with an NF instance or, conversely, items described as an NF instance may be replaced with an NF device. Similarly, in embodiments of the disclosure, items described as an NW slice may be replaced with an NW slice instance, or items described as an NW slice instance may be replaced with an NW slice.

FIG. 1 illustrates a wireless communication system according to various embodiments of the disclosure.

With reference to FIG. 1, as a part of nodes using a radio channel in the wireless communication system, a radio access node (RAN) 110 and a user equipment (UE) 120 are illustrated. Although FIG. 1 illustrates only one RAN 110 and only one UE 120, other RANs identical or similar to the RAN 110 may be further included. In addition, FIG. 1 illustrates that only one UE 120 communicates with one RAN 110. However, in actual, a plurality of UEs can communicate with one RAN 110.

The RAN 110 is a network infrastructure that provides a radio access to the UE 120. The RAN 110 has coverage (not shown in FIG. 1) defined as a certain geographic area based on a signal transmittable distance. The RAN 110 may be referred to as 'base station', 'access point (AP)', 'eNodeB (eNB)', '5th generation (5G) node', 'wireless point', 'transmission/reception point (TRP)', 'access network (AN)', or any other term having an equivalent technical meaning.

The UE 120 is a device used by a user and communicates with the RAN 110 through a radio channel. In some cases, the UE 120 may be operated without the user's involvement. For example, the UE 120 may be a device that performs machine type communication (MTC) and may not be carried by the user. The UE 120 illustrated in FIG. 1 may include at least one portable user device and may include at least one MTC. The UE 120 of FIG. 1 may be referred to as 'terminal', 'mobile station', 'subscriber station', 'remote terminal', 'wireless terminal', 'user device', or any other term having an equivalent technical meaning.

An AMF device 131 may be a network entity that manages wireless network access and mobility for the UE 120. An SMF device 132 may be a network entity that manages a connection of a packet data network for providing packet data to the UE 120. The connection between the UE 120 and the SMF 132 may be a protocol data unit (PDU) session.

A user plane function (hereinafter, UPF) device 133 may be a gateway for delivering packets transmitted or received by the UE 120, or a network entity serving as a gateway. The UPF 133 may be connected to a data network (DN) 140 connected to the Internet and thereby provide a path for data transmission/reception between the UE 120 and the DN 140. Thus, the UPF 133 may route, to the Internet data network, data to be transmitted to the Internet among packets transmitted by the UE 120.

A network slice selection function (NSSF) device 134 may be a network entity that performs a network selection operation described in the disclosure, for example, an operation of selecting a network slice. The operation of the NSSF device 134 will be described later in detail with reference to the drawings.

An authentication server function (AUSF) device 151 may be an equipment (network entity) that offers a service for processing subscriber authentication.

A network exposure function (NEF) device 152 may be a network entity that can access information to manage the UE 120 in the 5G network, subscribe to a mobility management event of the UE, subscribe to a session management event of the UE, request session-related information, configure charging information for the UE, request a change in a PDU session policy for the UE, and transmit small data about the UE.

A network repository function (NRF) device 153 may be an NF (network entity) that stores status information of NFs and has a function of processing a request to find an NF accessible by other NFs.

A policy and charging function (hereinafter, PCF) device 154 may be a network entity that applies a service policy, charging policy, and PDU session policy of a mobile communication operator for the UE 120.

A unified data management (hereinafter, UDM) device 155 may be a network entity that stores information about a subscriber and/or the UE 120.

An application function (AF) device 156 may be an NF (network entity) having a function of providing various services to users by interworking with a mobile communication network. Therefore, the AF device 156 may exist for each service.

A service communication proxy (SCP) device 157 is an NF (network entity) that provides functions such as NF discovery for communication between NFs and message transfer between NFs. The SCP 157 may operate in an integrated form with the NRF 153 according to an operator's selection, and in this case, the SCP 157 may include the function of the NRF 153, or conversely the NRF 153 may include the function of the SCP 157.

The above-described AMF device 131, SMF device 132, UPF device 133, NSSF device 134, AUSF device 151, NEF device 152, NRF device 153, PCF device 154, UDM device 155, AF device 156, and SCP device 157 may be implemented as instances in the form of software or firmware that runs in at least one or more devices and/or systems. In addition, the above-described devices 131, 132, 133, 134, 151, 152, 153, 154, 155, 156, and 157 may also be implemented in a hardware form if necessary. In the following description, the term "device" will be deleted for convenience of description. For example, the AMF device 131 will be referred to as the AMF 131, and the SMF device 132 will be referred to as the SMF 132.

Meanwhile, in FIG. 1, symbols on lines connected among each network entity the UE 120, and the RAN 110 may refer to interfaces of respective entities. For example, an N1 interface may be used between the U 120 and the AMF 131, an N2 interface may be used between the RAN 110 and the AMF 131, and an N3 interface may be used between the RAN 110 and the UPF 133. Similarly, an N4 interface may be used between the SMF 132 and the UPF 133, an N9 interface may be used between or inside the UPFs 133, and an N6 interface may be used between the UPF 133 and the DN 140. Also, the AUSF 151 may use an Nausf interface, and the NSSF 134 may use an Nnssf interface.

Figure 2:
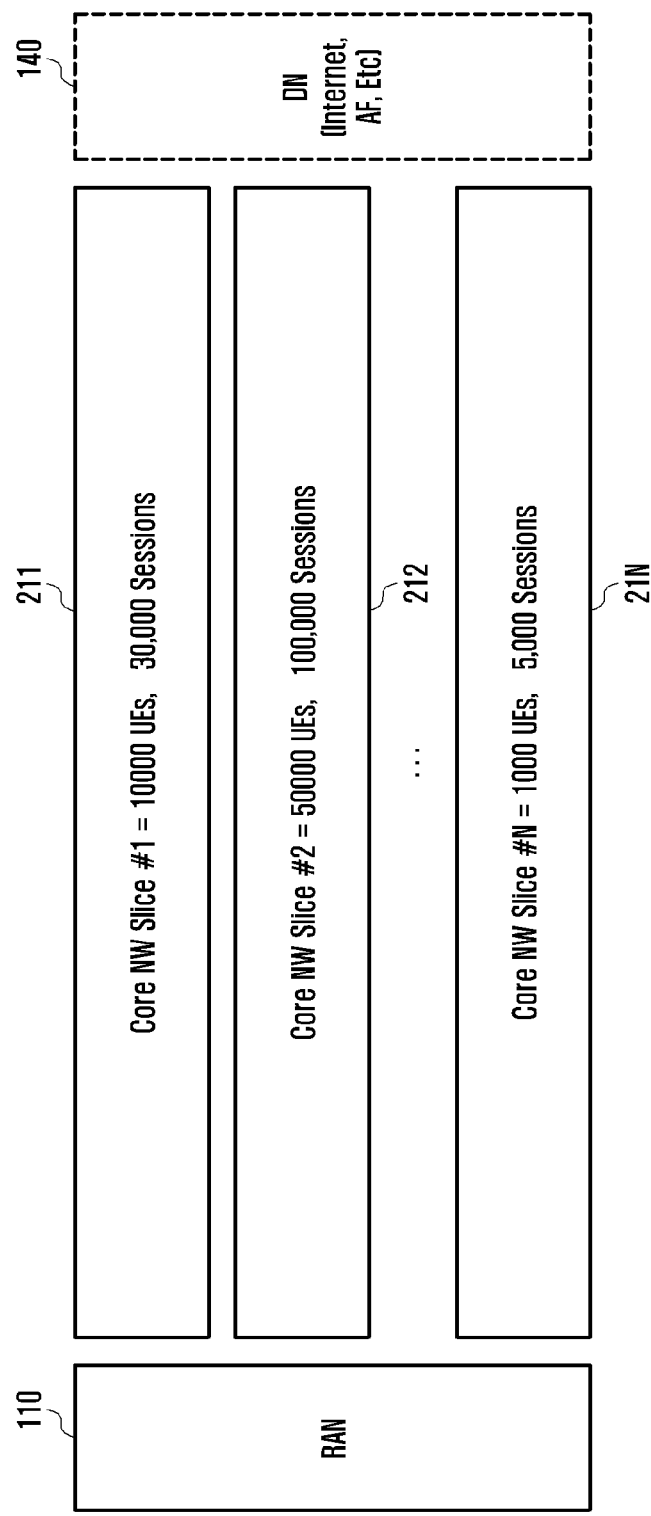
FIG. 2 illustrates a constitution of a wireless communication system according to various embodiments of the disclosure.

FIG. 2 illustrates a constitution of a wireless communication system according to various embodiments of the disclosure.

With reference to FIG. 2, a mobile communication system (an operator network such as 5G, 4G, etc.) may be composed of a wireless base station, for example, a radio access network (RAN) 110, and one or more core network slices. FIG. 2 exemplarily shows N core network slices 211, 212, ..., 21N. The RNA 110 may perform data transmission/reception between a UE (e.g., the UE 120 in FIG. 1) and the data network (DN) 140 through at least one core network slice. Depending on the constitution of the operator network, a core network may be constructed in a slice form or without a slice, and coexistence of both is also possible. Basically, one core network slice may include NFs of one or more core networks. In general, one NF corresponding to one core network includes the AMF 131, the SMF 132, and the UPF 133. According to another embodiment, the NF may be constructed without at least one of the AMF 131, the SMF 132, and the UPF 133. According to still another embodiment, the NF may include other network function devices in addition to the AMF 131, the SMF 132, and the UPF 133. According to yet another embodiment, the NF does not have at least one component among the AMF 131, the SMF 132, and the UPF 133, and may include at least one device other than the above-described devices.

In an embodiment of the disclosure, the respective network slices 211, 212, ..., 21N may provide services suitable for their characteristics, and the capacity that the respective network slices 211, 212, ..., 21N can provide at the same time may be different. The capacity of the network slices 211, 212, ..., 21N may be, for example, the maximum number of UEs (subscribers) and the number of sessions. Each of the network slices 211, 212, ..., 21N may control access to the network according to its capacity.

In FIG. 2, a first network slice 211 (Core NW Slice #1) allows access of 10,000 UEs and can accommodate 30,000 sessions. A second network slice 212 (Core NW Slice #2) allows access of 50,000 UEs and can accommodate 100,000 sessions. In addition, an Nth network slice 21N (Core NW Slice #N) allows 1,000 UEs and can accommodate 5,000 sessions.

As illustrated in FIG. 2, the capacity of the network slices 211, 212, ..., 21N may be configured differently for respective slices according to a setting of a mobile communication operator. If a certain slice is leased or sold to a separate service provider, the capacity may be configured differently for respective slices in accordance with a service level agreement (SLA).

According to various embodiments of the disclosure, the capacity of one network slice may be expressed by at least one of the following parameters.

1. The maximum number of subscribers, UEs, or users that can simultaneously access a network slice
2. The maximum number of sessions (PDU Sessions) that can be concurrently supported in the network slice
3. The maximum number of IP flows that can be concurrently supported by the network slice
4. The maximum number of QoS flows that can be concurrently supported by the network slice
5. The maximum number of guaranteed bit rate (GBR) flows that can be concurrently supported by the network slice According to various embodiments of the disclosure, the capacity of one network slice may be configured as the number of UEs of the above parameter 1 and the maximum number of sessions of the above parameter 2 as shown in FIG. 2. According to another embodiment, the capacity of one network slice may be configured using at least one or two or more parameters among the parameters 1 to 5.

On the other hand, the parameters related to session and flow, such as 2, 3, 4, and 5 of the above examples, may be expressed as a value for each slice (e.g., 10,000 sessions supported per network slice) or expressed as a specific value per accessing UE (e.g., up to four sessions supported at the same time for each UE accessing a network slice).

According to various embodiments of the disclosure, through the capacity control for each network slice as described above, it is possible to protect the operator's mobile communication network from overload, effectively use the network resources, and perform accurate charging between the mobile communication operator and the network slice user.

FIG. 3 is a signal flow diagram illustrating an operation of performing access control for each network slice according to various embodiments of the disclosure.

Before the description with reference to FIG. 3, an NF 300 may have the constitution as described with reference to FIG. 2. For example, the NF 300 may include the AMF 131, the SMF 132, and the UPF 133. According to another embodiment, the NF 300 may include at least one of the AMF 131, the SMF 132, and the UPF 133. According to still another embodiment, the NF 300 may further include a network function device other than the AMF 131, the SMF 132, and the UPF 133. According to yet another embodiment, the NF 300 may include at least one of the AMF 131, the SMF 132, and the UPF 133 and at least one other device in addition to the above-mentioned devices. According to further another embodiment, a separate function device for controlling the operation performed in the NF 300 of FIG. 3 may be additionally provided.

With reference to FIG. 3, at operation 310, the NF 300 belonging to one specific network slice may call a service for notifying its own network slice related information to the network slice selection function (NSSF) 134. At the operation 310, the service used by the NF 300 may use a "Nnssf_NSSAIAvailability_Update" message. The Nnssf_NSSAiAvailability_Update message may be a network slice selection assistance information (NSSAI) availability update message.

In the following embodiment of the disclosure, the description will be made using the NSSF 134. According to another embodiment, without using the NSSF 134, it may be implemented using another specific network device having a function of storing information about a network slice and assisting the selection of a network slice. A SupportedNssaiAvailabilityData message, which is a supported NSSAI availability data message delivered to the NSSF 134 by the NF 300, may contain a location of the NF 300 (tracking area indicator, TAI) and a list of identifiers (S-NSSAI) of network slices to which the NF 300 belongs. Also, if a network slice instance is used, a slice instance identifier to which the NF (or NF instance) belongs may be contained. Specifically, the NF, the NF instance, and the NW slice instance may all be separate concepts. For example, because the NF instance is allocated physical and/or logical resources from a specific system of the core network to perform the function of the NF as described above, the NF instance can perform the same operation as the NF. However, the NF and the NF instance may exist for the same NF. For example, a case in which a plurality of SMFs exist will be described as an example. For example, when there are two SMFs, one may be implemented as a physical device, and the other may be implemented as an NF instance. This can be equally applied even when there are three or more SMFs. Conversely, when there are two or more SMFs, all the SMFs may be implemented only as physical devices, or all the SMFs may be implemented as SMF instances.

From this point of view, the NW slice instance may also be implemented in the form of being combined with physical NFs, and all may be implemented as NFs allocated physical and/or logical resources from a specific system of the core network.

In this case, for capacity control for each network slice, a capacity parameter may be contained for each network slice identifier (NW slice ID). The capacity parameter may be one or more of the above-described parameters 1 to 5.

According to various embodiments of the disclosure, information contained in a message transmitted by the NF 300 may have various forms. Hereinafter, the form of a message transmitted by the NF 300 according to the disclosure will be described with reference to FIGS. 4A to 4E.

FIGS. 4A to 4E are diagrams illustrating information contained in a message transmitted by an NF 300 according to various embodiments of the disclosure.

FIG. 4A shows the constitution of a SupportedNssaiAvailabilityData message according to an embodiment of the disclosure. With reference to FIG. 4A, attribute name fields may include 'tai', 'NF Type', 'supportedSnssaiList', and 'supportedSnassiCapacity'. Because the attribute name fields shown in FIG. 4A are fields according to an embodiment of the disclosure, additional fields may be further included.

Among the attribute name fields, 'tai' is an element containing the identifier of a tracking area. Among the attribute name fields, 'NF Type' is an element containing the type of a consumer NF. Among the attribute name fields, 'supportedSnssaiList' may contain a list of S-NSSAIs supported by the NF 300, and if the TAI is included, this information is valid for the TA. Among the attribute name fields, 'supportedSnassiCapacity' may be an element containing the capacity of each corresponding single network slice selection assistance information (S-NSSAI).

FIG. 4B shows the constitution of SliceCapacity corresponding to the 'supportedSnassiCapacity' attribute in the message as shown in FIG. 4A according to an embodiment of the disclosure.

With reference to FIG. 4B, the attribute name fields of SliceCapacity may include at least one of 'maxUEs', 'maxSessions', 'maxIPFlows', 'maxQoSFlows', and 'maxGBRFlows'.

Among the attribute name fields of FIG. 4B, 'maxUEs' indicates the maximum number of UEs supported by the corresponding network slice, Among the attribute name fields of FIG. 4B, 'maxSessions' indicates the maximum number of sessions supported by the corresponding network slice. Among the attribute name fields of FIG. 4B, 'maxIPFlows' indicates the maximum number of IP flows supported by the corresponding network slice. Among the attribute name fields of FIG. 4B, 'maxQoSFlows' indicates the maximum number of QoS flows supported by the corresponding network slice. Among the attribute name fields of FIG. 4B, 'maxGBRFlows' indicates the maximum number of GBR flows supported by the corresponding network slice.

The above-described attribute name fields of FIG. 4B may be information corresponding to the capacity of the network slice described above with reference to FIG. 2.

FIG. 4C shows the constitution of a SupportedNssaiAvailabilityData message according to another embodiment of the disclosure. With reference to FIG. 4C, attribute name fields may include 'Tai', 'NF Type', and 'supportedSnssaiList'. Because the attribute name fields shown in FIG. 4C are fields according to an embodiment of the disclosure, additional fields may be further included.

The attribute name fields of 'Tai' and 'NF Type' in FIG. 4C may be the same information as the attribute name fields described above in FIG. 4A. However, in FIG. 4C, the field of 'supportedSnssaiList' may contain network slice information supported by the NF 300, and if the TAI is included, this information is valid for the TA. In case of constructing the SupportedNssaiAvailabilityData message as shown in FIG. 4C, the attribute for each array constituting the 'supportedSnssaiList' may be defined as in FIG. 4D.

FIG. 4D shows the constitution of SliceCapacity corresponding to the 'supportedSnassiCapacity' attribute in the message as shown in FIG. 4A according to an embodiment of the disclosure.

With reference to FIG. 4D, the attribute name fields of SliceCapacity may include at least one of 'supportedSlice' and 'supportedSliceCapacity'. The 'supportedSlice' field of FIG. 4D may contain the identifier of a tracking area, and the 'supportedSliceCapacity' field of FIG. 4D may indicate the capacity of a corresponding network slice and may contain one or a plurality of parameters.

FIG. 4E shows the constitution of SliceCapacity corresponding to the 'supportedSliceCapacity' attribute name field of FIG. 4D according to an embodiment of the disclosure.

With reference to FIG. 4E, the attribute fields of SliceCapacity may include at least one of 'maxUEs', 'maxSessions', 'maxIPFlows', 'maxQoSFlows', and 'maxGBRFlows'.

Among the attribute name fields of FIG. 4E, 'maxUEs' indicates the maximum number of UEs supported by the corresponding network slice. Among the attribute name fields of FIG. 4E, 'maxSessions' indicates the maximum number of sessions supported by the corresponding network slice. Among the attribute name fields of FIG. 4E, 'maxIPFlows' indicates the maximum number of IP flows supported by the corresponding network slice. Among the attribute name fields of FIG. 4E, 'maxQoSFlows' indicates the maximum number of QoS flows supported by the corresponding network slice. Among the attribute name fields of FIG. 4E, 'maxGBRFlows' indicates the maximum number of GBR flows supported by the corresponding network slice.

The above-described attribute name fields of FIG. 4E may be information corresponding to the capacity of the network slice described above with reference to FIG. 2.

Returning to FIG. 3, at the operation 310 as described above, the NF 300 may transmit the "Nnssf_NSSAIAvailability_Update" message to the NSSF 134 in order to call a service for notifying its own network slice related information.

Then, at operation 320, the NSSF 134 may store the information received from the NF 300 and, in response to the service request, transmit an NSSAI Availability Update response message to the NF 300 that has transmitted the Nnssf_NSSAIAvailability_Update message. Thereafter, when a request for providing information about a specific network slice or selecting a network slice is received from the NF 300, the NSSF 134 may respond using the stored information.

At operation 330, the NSSF 134 may request the NF 300 to notify a status or configuration when it is changed, or request the NF 300 to periodically inform the current status/configuration information. This request may be implemented as a subscribe message for an NF status change or a request message for reporting on a specific event. In this case, the request message may contain information (identifier) about the corresponding network slice to be a target, and status/configuration information to be received. The status information to be received may contain the following parameters. If a response is received only when a specific condition is met, the condition (threshold for a specific value, etc.) may be contained. If periodic information reporting is requested, the request message may contain a period for response.

The status information to be received by the NSSF 134 may contain the following values.

(1) Parameter (maximum value) for capacity per network slice as described above (2) Current status per network slice (3) Current capacity per network slice The current status per network slice may contain the following information.

The number of subscribers, UEs, or users being currently accessing the network slice The number of subscribers, UEs, or users registered in the network slice The number of sessions (PDU Sessions) supported by the network slice The number of IP flows supported by the network slice The number of QoS flows supported by the network slice The number of GBR flows supported by the network slice The current usage per network slice may contain the following information.

The number of subscribers, UEs, or users being currently accessing the network slice/The maximum number of subscribers, UEs, or users that can be supported by the network slice*100

The number of sessions (PDU Sessions) supported by the network slice/The maximum number of sessions that can be supported by the network slice*100

The number of IP flows supported by the network slice/The maximum number of IP flows that can be supported by the network slice*100

The number of QoS flows supported by the network slice/The maximum number of QoS flows that can be supported by the network slice*100

The number of GBR flows supported by the network slice/The maximum number of (GBR flows that can be supported by the network slice*100

As such, the current usage per network slice is in the form of dividing the current usage by the maximum supportable usage and multiplying it by 100, thus being percentage (%) information.

At operation 340, in response to the request of the NSSF 134, the NF 300 may generate and transmit a reporting (NF status change notification) message about network slice information of the NF 300. If a condition for reporting is configured, the NF 300 may generate the reporting message and transmit it to the NSSF 134 only when the condition is satisfied. Accordingly, the NSSF 134 may receive the reporting message. Also, the NSSF 134 may update pre-stored data, based on the received reporting message.

On the other hand, in an embodiment of the disclosure, when a specific network slice instance is selected as a result of network slice selection, and a network slice instance (NSI) ID is contained in the response message, subsequent selection of an NF belonging to the network slice may be made using an NSI ID. A basic operating principle is as follows.

(1) The NF 300 may inform the NSSF 134 of information about the network slice, to which it belongs, through a predetermined message, for example, an Nnssf_NSSAI-Availability service (message). If the NF 300 is composed of a plurality of devices, for example, the AMF 131, the SMF 132, and the UPF 133, each NF device may inform the NSSF 134 of the information about the network slice, to which it belongs, through the Nnssf_NSSAIAvailability service (message).

(2) The N 300 may register its own information and network slice information to the NRF 153 through an NF registration service (message). If the NF 300 is composed of a plurality of devices, for example, the AMF 131, the SMF 132, and the UPF 133, each device may register information about the network slice, to which it belongs, to the NRF 153 by using an NP registration service (message).

(3) When it is necessary to select a network slice or to select an NF belonging to a network slice, the NF 300 may transmit a network slice selection request message to the NSSF 134. In this case, the NSSF 134 may select a network slice instance corresponding to a network slice by using the previously received information and respond by using a network slice instance identifier.

(4) The NF 300 may transmit a request message for NF selection and discovery to the NRF 153. This request may specify the network slice instance identifier received from the NSSF 134, and an NF type or NF service to be selected/discovered.

(5) The NRF 153 may select an NF belonging to a network slice instance by using the previously received information. In this case, the selection may be performed in consideration of the maximum capacity for each network slice and the current load state, received from the NF 300, according to an embodiment of the disclosure.

(6) The NRF 153 may transmit a message containing information about the selected NF 300 to the NF 300 requesting the selection. If the selection fails, information containing a reason for the selection failure and information about the current NF may be added in a response message and transmitted.

(7) The NF 300 finally selects an NF to provide a service, by using the information received from the NRF 153, and performs the remaining operations. For example, the first NF may select another second NF by using the information received from the NRF 153. An example of this operation will be described below in detail with reference to a flow diagram.

Figure 5:
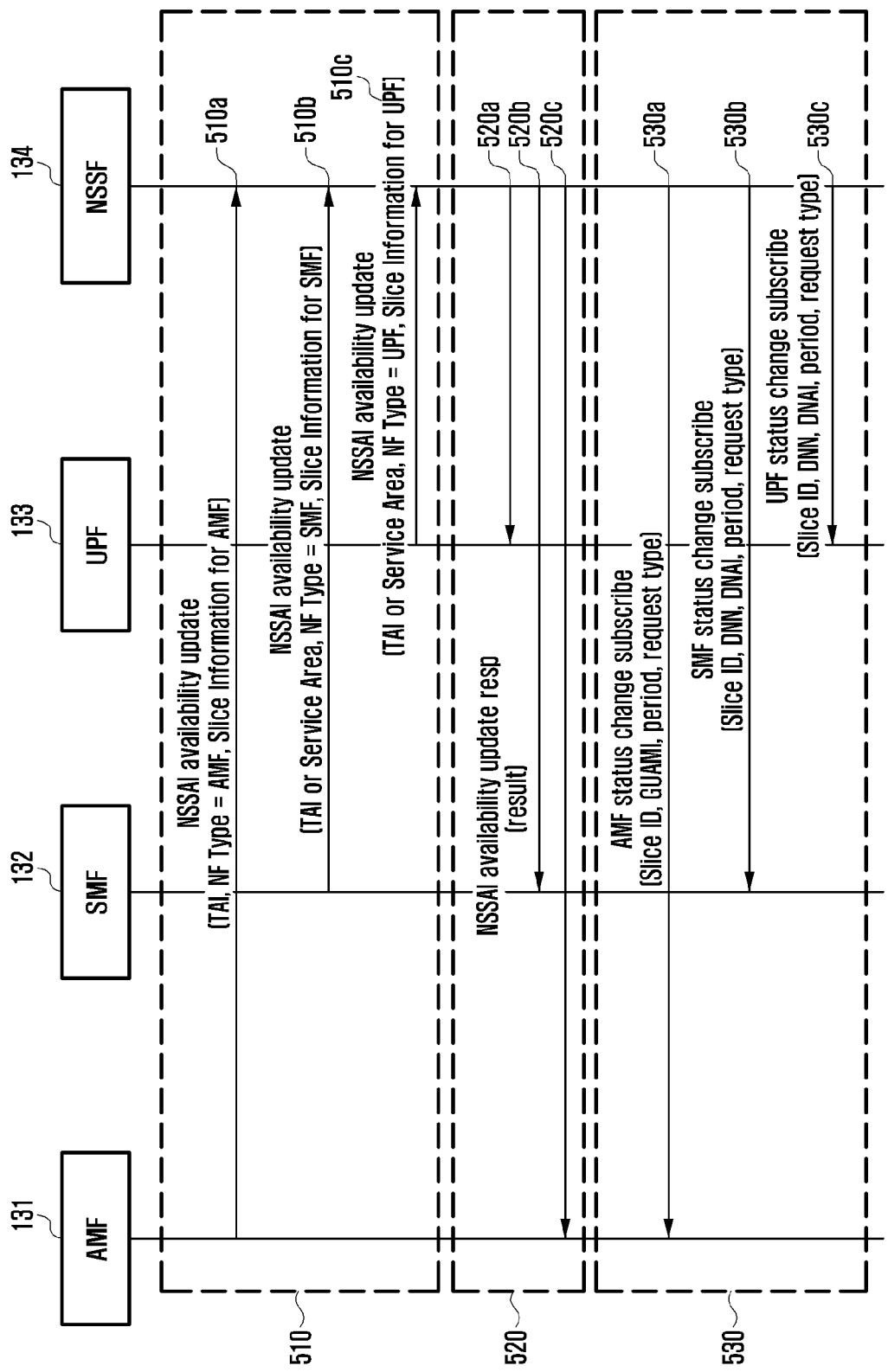
FIG. 5 is a signal flow diagram illustrating a control operation in consideration of the capacity of a network slice during registration management, mobility management, and session management of a UE according to an embodiment of the disclosure.

FIG. 5 is a signal flow diagram illustrating a control operation in consideration of the capacity of a network slice during registration management, mobility management, and session management of a UE according to an embodiment of the disclosure.

Although FIG. 5 shows the entire procedure that the AMF 131, the SMF 132, and the UPF 133 are included in a network slice and operate, it may be applied only to some NFs or the operation sequence for each NF may be changed, depending on network slice constitution or configuration. However, it should be noted that FIG. 5 illustrates a signal flow for explaining operations in an overall perspective.

In the following description, the NF 300 is described in a form including the AMF 131, the SMF 132, and the UPF 133, and the NF 300 may have a meaning to collectively refer to the AMF 131, the SMF 132, and the UPF 133. In addition, the NF 300 may correspond to one network slice. For example, the AMF 131, the SMF 132, and the UPF 133 included in the NP 300 may be implemented as a device and/or software and/or firmware for operating in the same single network slice. Also, the AMF 131, the SMF 132, and the UPF 133 included in the NF 300 may be some functions allocated to the corresponding network slice in the AMF device, the SMF device, and the UPF device.

At operation 510, the NF 300, for example, the AMF 131, the SMF 132, and the UPF 133, may call a service for notifying its own network slice related information to the network slice selection function (NSSF) 134. In the example of FIG. 5, the service used by the NT 300 may be an Nnssf_NSSAIAvailability_Update message. Although the description is made using the NSSF 134 in this embodiment, it may be performed by another specific network entity having a function of storing information of a network slice and assisting the selection of a network slice according to various embodiments of the disclosure.

In an example of operation 510a, if the NF 300 is the AMF 131, the NF type is configured as AMF (NF type=AMF), and the information (SupportedNssaiAvailabilityData) message transmitted to the NSSF 134 by the AMF 131 may contain a location (TAI) of the AMF 131 and an identifier (S-NSSAI) list of a network slice to which the AMF 131 belongs. In this case, for capacity control per network slice, a capacity parameter per network slice identifier may be contained. The capacity parameter may be one or more of the parameters described above in the embodiments of FIGS. 3 and 4A to 4E. For example, for the AMF 131, the maximum number of UEs (subscribers or users) capable of being provided in a network slice may be contained.

In an example of operation 510b, if the NF 300 is the SMF 132, the NF type is configured as SMF (NF type=SMF), and the information (SupportedNssaiAvailabilityData) message transmitted to the NSSF 134 by the SMF 132 may contain a location (TAI or service area ID) of the SMF 132 and an identifier (S-NSSAI) list of a network slice to which the SMF 132 belongs. In this case, for capacity control per network slice, a capacity parameter per network slice identifier may be contained. The capacity parameter may be one or more of the parameters described above in the embodiments of FIGS. 3 and 4A to 4E. For example, for the SMF 132, the maximum number of sessions and the maximum number of flows (IP flow, QoS flow, GBR flow) capable of being provided in a network slice may be contained.

In an example of operation 510c, if the NF 300 is the UPF 133, the NF type is configured as UPF (NF type=UPF), and the information (SupportedNssaiAvailabilityData) message transmitted to the NSSF 134 by the UPF 133 may contain a location (TAI or service area ID) of the UPF 133 and an identifier (S-NSSAI) list of a network slice to which the UPF 133 belongs. In this case, for capacity control per network slice, a capacity parameter per network slice identifier may be contained. The capacity parameter may be one or more of the parameters described above in the embodiments of FIGS. 3 and 4A to 4E. For example, for the UPF 133, the maximum data rate capable of being provided in a network slice may be contained.

At operation 520, the NSSF 134 may store the information received from the NF 300 and, in response to the service request, transmit a response message to the requesting NE 300. Thereafter, when a request for providing information about a specific network slice or selecting a network slice is received from the NF 300, the NSSF 134 may respond using the stored information.

According to an embodiment, if the NF 300 is the UPF 133, the NSSF 134 may store the information received from the UPF 133 at the operation 510c and transmit a response message to the UPF 133 at operation 520a. According to another embodiment, if the NF 300 is the SMF 132, the NSSF 134 may store the information received from the SMF 133 at the operation 510b and transmit a response message to the SMF 132 at operation 520b. According to still another embodiment, if the NF 300 is the AMF 131, the NSSF 134 may store the information received from the AMF 131 at the operation 510a and transmit a respond message to the AMF 131 at operation 520c.

At operation 530, the NSSF 134 may request the NF 300 to notify a status or configuration when it is changed, or request the NF 300 to periodically inform the current status/configuration information. This request may be implemented as a subscribe message for an NF status change or a request message for reporting on a specific event. In this case, the subscribe message or request message may contain information (identifier) about the network slice to be a target, and status/configuration information to be received. The status information to be received may contain following parameters.

If a response is received only when a specific condition is met, the condition (threshold for a specific value, etc.) may be contained. If periodic information reporting is requested, the request message may contain a period for response.

If the NF 300 is the AMF 131, the NSSF 134 may request, at operation 530a, reporting on the number of currently registered UEs and the number of accessing UEs in relation to a specific network slice among the status information of the AMF 131. If the NF 300 is the SMF 132, the NSSF 134 may request, at operation 530b, reporting on the number of currently established sessions and the number of activated sessions in relation to a specific network slice among the status information of the SMF 132. In addition, if the NF 300 is the SMF 132, the NSSF 134 may additionally request information for each specific data network name (DNN) or data network access identifier (DNAI). If the NF 300 is the UPF 133, the NSSF 134 may request, at operation 530c, reporting on the current data rate in relation to a specific network slice among the status information of the UPF 133, and request information for each specific DNN or DNAI.

Meanwhile, in the above embodiment, instead of the NSSF 134 that stores information about a network slice and provides the information upon selecting the network slice, the NRF 153 (or a service communication proxy (SCP) 157) that stores information for each NF and provides the information upon selecting the NF may be used alternatively. For example, the NFR 153 may basically store NF information, and the NF information may include information about a network slice to which the corresponding NF belongs. Therefore, when providing selection information to a specific NF in a state where information is stored for each NF, the NRF 153 may provide the stored NF information together with network slice information to which the corresponding NF belongs. In the same way as above, the SCP 157 may perform the operation of the NRF 153.

If the NRF 153 is used, an operation that each NF (AMF, SMF, or UPF) transmits its own information and associated network slice information to the NRF 153 may be performed in the NF service registration operation. In this case, the NF profile transmitted by each NF may contain not only basic NF information but also the network slice information described at the operation 510. Similarly, for the NF 300, the NRF 153 may request and receive reporting on the current status information of the network slice from the corresponding NF. In this case, similar to the operation 530, the subscribe message for status change reporting or a status check function (heartbeat) between the NRF 153 and the NF may be used. In addition, request information and response information may contain the parameters described above in the operation 530.

Figure 6:
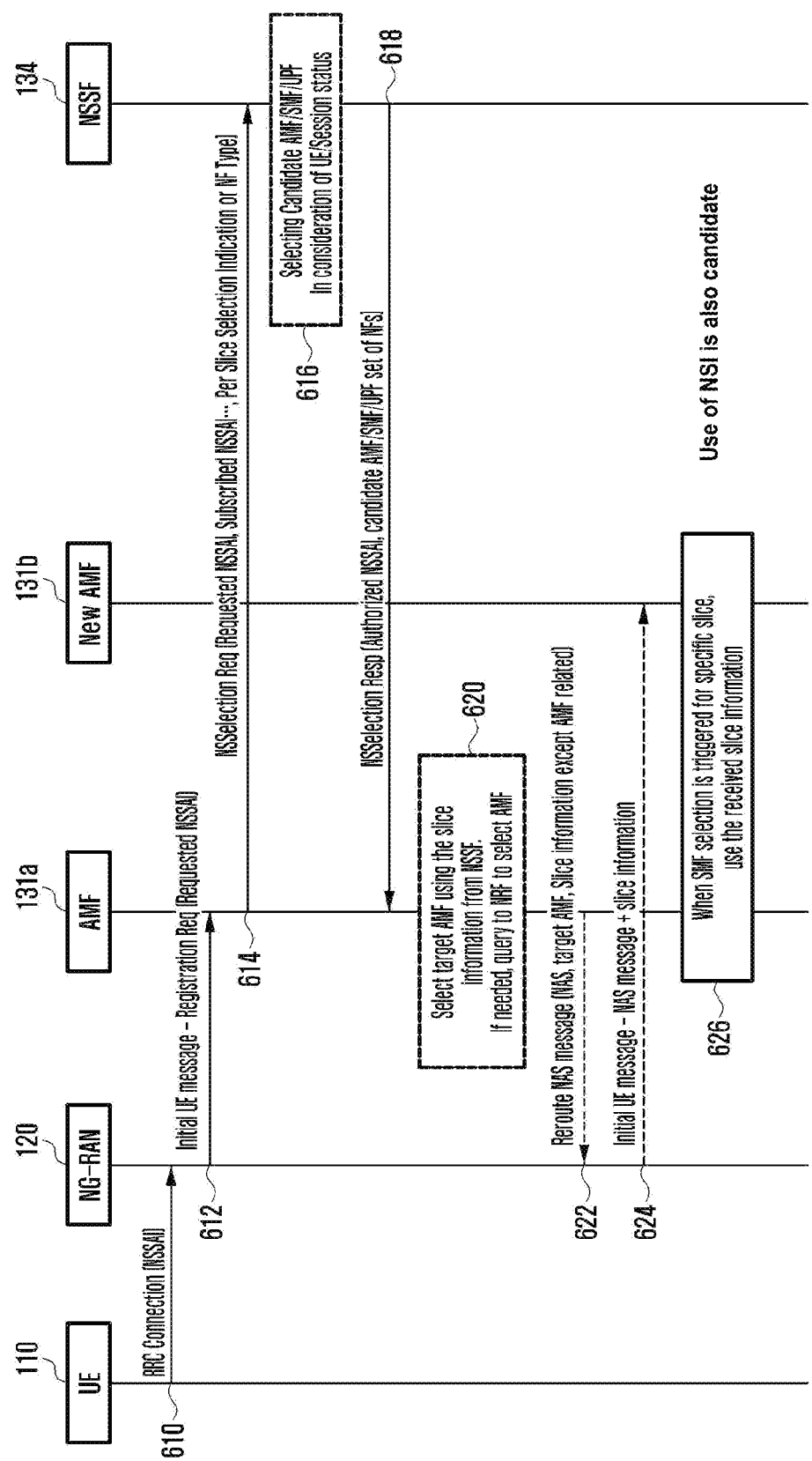
FIG. 6 is a signal flow diagram illustrating an operation of performing access control of a UE according to an embodiment of the disclosure.

FIG. 6 is a signal flow diagram illustrating an operation of performing access control of a UE according to an embodiment of the disclosure.

The signal flow diagram of FIG. 6 exemplarily shows a case in which the NSSF 134 becomes a subject according to the disclosure. However, as described above with reference to FIG. 5, the NRF 153 or the SCP 157 may be substituted for the NSSF 134.

At operation 610, the UE 120 may select a network slice desired to access and transmit a connection request (RRC Connection (NSSAI)) message to the RAN 110. In FIG. 6, the NG-RAN is only illustrated as an example of a base station and is not construed as a limitation. That is, any base station among the various types of base stations described above with reference to FIG. 1 may be used.

At operation 612, the NG-RAN 110 may select a first AMF 131a by using a network slice identifier specified by the UE 120 and transmit, to the first AMF 131a, an initial UE message (Initial UE message—Registration Req (Requested NSSAI)) containing a registration request, based on the connection request message transmitted by the UE, for example, an N1 (NAS) message (the registration request message described in embodiments of the disclosure). If the UE does not specify a network slice identifier at the operation 610 or if it is not possible to select the first AMF 131a with the network slice information specified by the UE, the NG-RAN 110 may select one AMF in accordance with an AMF selection rule. As such, the NG-RAN 110 may select the first AMF 131a, based on the network slice information specified by the UE 120, or in accordance with the AMF selection rule, and transmit the initial UE message (Initial UE message—Registration Req (Requested NSSAI)) to the first AMF 131a.

At operation 614, the first AMF 131a may perform an operation of processing a registration request message transmitted by the UE 120 through the NG-RAN 110. If it is necessary to select a new network slice for the UE 120, change a network slice, or select a new AMF belonging to a network slice, the first AMF 131a may transmit a network slice selection request (NSSelection Req) message to the NSSF 134. The network slice selection request (NSSelection Req) message may be performed through a GET operation of the Nnssf_NSSelection Service provided by the NSSF 134.

On the other hand, if the first AMF 131a does not need to select a new network slice, change a network slice, or select a new AMF belonging to a network slice, it may not perform operations after the operation 612.

When transmitting the network slice selection request (NSSelection Req) message at the operation 614, the first AMF 131a may add the network slice identifiers (Requested NSSAI) requested by the UE 120, and the network slice identifiers (Subscribed NSSAI) contained in the subscription information. In addition, when transmitting the network slice selection request (NSSelection Req) message, the first AMF 131a may inform that a selection target is all NFs included in the network slice, or may designate a specific NF type in the network slice as a selection target.

At operation 616, the NSSF 134 may perform an operation of selecting a network slice in response to the request of the first AMF 131a. At this time, information for each slice (maximum capacity for each slice, current load (usage)) received or stored through the above-described embodiments of FIGS. 2 to 5 may be considered. If the request of the first AMF 131a is the entire network slice, the selection of a network slice and the selection of candidate NFs included in the network slice may be made in consideration of the overall status of the network slice. For example, if the AMF 131, the SMF 132, and the UPF 133 are included in the network slice, all of them may be included in candidate NFs. If the request of the first AMF 131a designates a specific NF belonging to the network slice, candidate NFs having the corresponding NF type may be selected. If the network slice is formed of an instance, one network slice instance may be selected. If there are multiple NFs or instances as a selection target, the selection may be made so as to distribute the load in consideration of the received maximum capacity and current load status.

At operation 618, in response to the network slice selection request (NSSelection Req) message from the first AMF 131a, the NSSF 134 may transmit, to the first AMF 131a, a network slice selection response (NSSelection Resp) message containing network slice information. In this case, the network slice selection response may be implemented in the form of Nnssf_NSSelection Service and may include authenticated network slice information (AuthorizedNetworkSliceInfo) containing the previously selected network slice information. For example, if the request of the first AMF 131a is the entire network slice, the AuthorizedNetworkSliceInfo may contain information on the network slice and candidate NFs therein, selected in consideration of the overall status of the network slice. If the network slice includes the AMF 131 (referring to both the first AMF 131a and the second AMF 131b), the SMF 132, and the UPF 133, their candidate information may be contained. If the request of the first AMF 131a designates a specific NF belonging to the network slice, information on the selected candidate NFs having the corresponding NF type may be contained. If the network slice is formed of an instance, the selected one slice instance may be contained. Information containing the network slice may be constructed in the form of a name or identifier that allows the selected candidate or selected instance to be identified. If the selection of the network slice or NF that can process the request fails, for example, if the allowable capacity in the corresponding network slice is exceeded, the NSSF 134 may add a failure result and reason in the network slice selection response message. Through this, the NSSF 134 may inform the first AMF 131a of the reason that the selection of the NF has failed.

At operation 620, the first AMF 131a that has received the network slice selection response message through the operation 618 may identify whether the selection of a new AMF is necessary, by using the received information. If the new AMF selection is required, and if additional information is required for the new AMF selection, an AMF selection process may be performed through the NRF 153 (or the SCP 157)(not shown in FIG. 6) in this case, the AMF selection may consider the network slice information and candidate AMFs previously received at the operation 618.

At operation 622, if the AMF needs to be changed, the first AMF 131a transmit to the NF-RAN 110 a reroute request message (Reroute NAS message) for rerouting the registration process for the UE 120 to the selected AMF, for example, the new second AMF 131b in FIG. 6. The Reroute NAS message transmitted to the NG-RAN 110 by the first AMF 131a may contain the N1 (NAS) message received from the UE 120, an identifier of the selected new second AMF 131b, and the network slice information received from the NSSF 134 at the operation 618. If it is unnecessary to change the AMF after reroute, the network slice information may be transmitted without AMF information.

At operation 624, the NG-RAN 110 may transmit an initial UE message to the second AMF 131b selected based on the Reroute NAS message received from the first AMF 131a. In this case, the initial UE message may be referred to as different names, and may contain the message transmitted to the NG-RAN 110 by the UE 110 at the operation 610 and the NAS message and network slice information acquired from the first AMF 131a.

Thereafter, at operation 626, a registration procedure for the UE 120 may be performed between the first AMF 131a and the new second AMF 131b. Here, the registration procedure may be performed when there is additionally necessary information in addition to the information transmitted through the NG-RAN 110.

Figure 7:
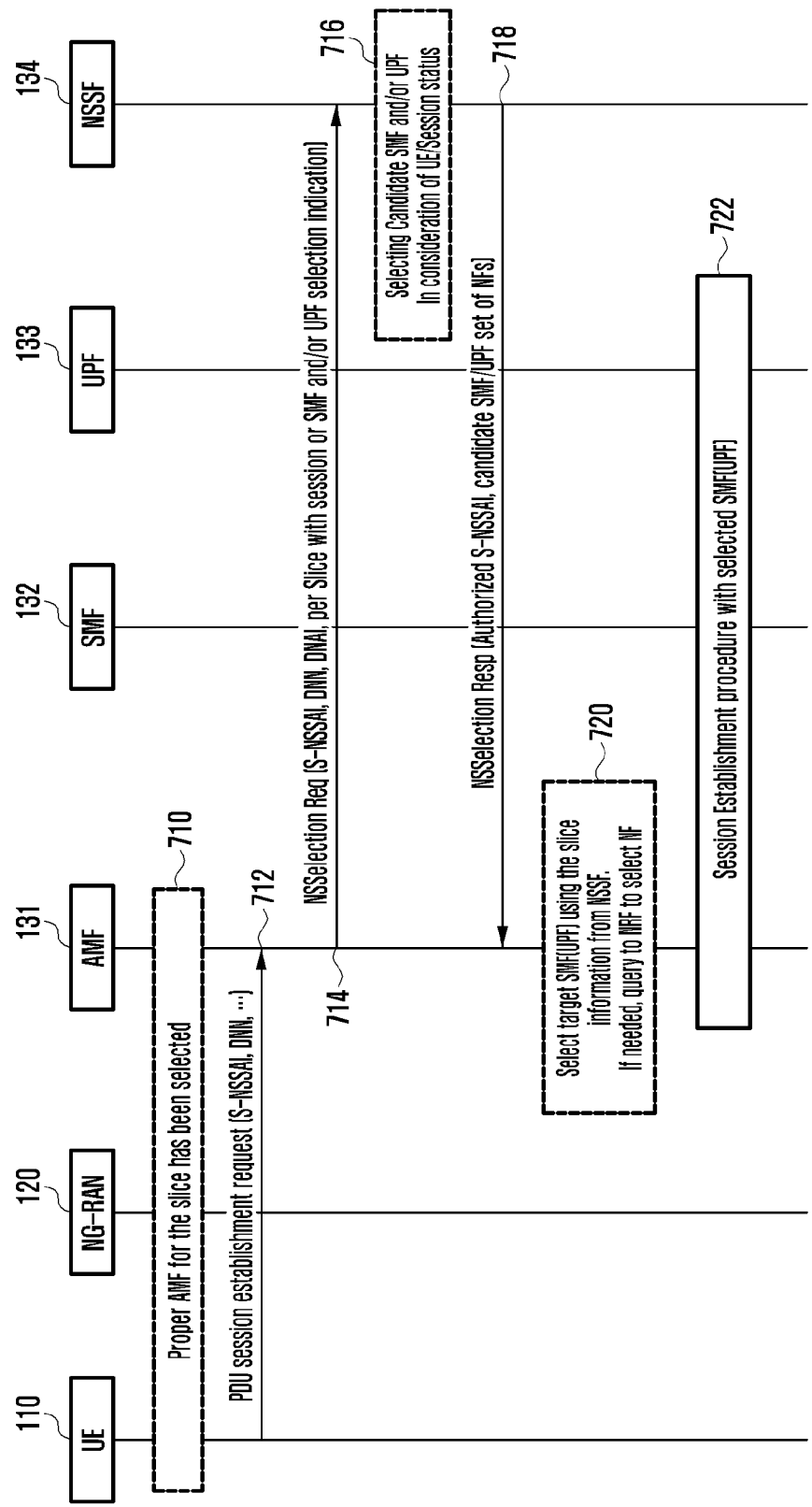
FIG. 7 is a signal flow diagram based on a network slice status in a session establishment procedure according to an embodiment of the disclosure.

FIG. 7 is a signal flow diagram based on a network slice status in a session establishment procedure according to an embodiment of the disclosure.

With reference to FIG. 7, at operation 710, a specific network slice may be selected during the registration procedure among the UE 110, the AMF 131, and the NFs.

At operation 712, when a PDU session establishment is required, the UE 110 may transmit a PDU session establishment request message to the AMF 131. The PDU session establishment message may contain information about a target of PDU session establishment, for example, a DNN and a slice identifier.

At operation 714, when there is a need to select a network slice or a specific NF (SMF/UPF) belonging to a network slice in the session establishment requested by the UE 110, the AMF 131 may transmit a network slice selection request (NSSelection Req) message to the NSSF 134. The network slice selection request message may use a GET operation of the Nnssf_NSSelection Service provided by the NSSF 134. Upon transmitting the network slice selection request message, the AMF 131 may add network slice identifiers requested by the UE 110 and network slice identifiers contained in subscription information. In addition, upon transmitting the network slice selection request message, the AMF 131 may inform that a selection target is all NFs included in the network slice during the session establishment, or may designate a specific NF type (SMF and/or UPF) in the network slice as a selection target. Also, the AMF 131 may additionally transmit information about the session by using DNN or DNAI during the session establishment.

At operation 716, the NSSF 134 may perform an operation of selecting a network slice in response to the request of the AMF 131. At this time, information per network slice (maximum capacity per slice, current load (usage)) received or stored through the above-described embodiments may be considered. If the request of the AMF 131 is the entire network slice, the selection of the network slice and the selection of candidate NFs included in the network slice may be made in consideration of the overall status of the network slice. If the SMF 132 and the UPF 133 are included in the network slice, both may be included. If the request of the AMF 131 designates a specific NF belonging to the network slice, candidate NF s having the corresponding NF type may be selected. If the network slice is formed of an instance, one slice instance may be selected. If there are multiple NFs or instances as a selection target, the selection may be made so as to distribute the load in consideration of the received maximum capacity and current load status. If DNN or DNAI is specified, supportability may be considered when selecting a slice and an NF belonging to the slice.

At operation 718, the NSSF, 134 may generate a network slice selection response (NSSelection Resp) message in response to the network slice selection request message and transmit it to the AMF 131. The network slice selection response message may contain selected network slice information. In this case, the network slice selection response message may use the Nnssf_NSSelection Service, and more specifically, may include authenticated network slice information (AuthorizedNetworkSliceInfo) containing the previously selected slice information. For example, if the request of the AMF 131 is the entire network slice, the authenticated network slice information (AuthorizedNetworkSliceInfo) may contain information on the network slice and candidate NFs therein, selected in consideration of the overall status of the network slice. If the network slice includes the SMF 132 and the UPF 133 related to the session, their information may be contained. If the request of the AMF 131 designates a specific NF belonging to the network slice, information on the selected candidate NFs having the corresponding NF type may be contained. If the network slice is formed of an instance, the selected one slice instance may be contained. Contained information may be constructed in the form of a name or identifier that allows the selected candidate or selected instance to be identified. If the selection of the network slice or NF that can process the request fails, for example, in case of exceeding the capacity of the network slice, the NSSF 134 may notify a failure result and reason for the network slice selection.

At operation 720, the AMF 131 may identify whether the selection of the SMF is necessary, by using information contained in the received network slice selection response message. If the SMF selection is required, and if additional information is required for the SMF selection, an SMF selection process may be performed through the NRF 153 (or the SCP 157)(not shown in FIG. 7). In this case, the SMF selection may consider the network slice information and candidate SMFs previously received at the operation 718.

At operation 722, the AMF 131 may perform the remaining session establishment procedure for the UE 110 through the selected SMF 132. If the network slice information is received at the operation 718 and information for the SMF or UPF selection is contained in the network slice information, the AMF 131 may transmit it to the SMF 132 and/or the UPF 133.

Included in the disclosure described below are conditions for selecting a slice (S-NSSAI) to be used in the UE's network (5GS) registration process or the PDU session establishment process, and a procedure and information related to deregistration for unused slices. In the disclosure, one NF in the operator network transmits a policy or UE configuration to be used upon selecting a network slice to the UE. The NF may be the UDM (based on subscription information), the PCF (based on policy), or any other NF that stores information for slice control. The NF may firstly transmit information to another NF (e.g., the AMF or the SMF) that manages the slice status for each UE during the communication process with the UE, which may be converted into a NAS layer message and delivered to the UE The policy/configuration to be used for slice selection may include the following information.

Slice ID: S-NSSAI

Slice usage type: A slice type (hereinafter referred to as Type 1) that is requested upon initial access (registration) and, if permitted, continuously used, or a slice type (hereinafter referred to as Type 2) that is requested only when necessary and released upon terminated in use or upon unused for a certain time Slice duration timer: A timer for determining, for a Type 2 slice, whether unused and whether it needs to be released In addition, the status of each slice managed by the UE and the network (5GS) may be one of the following statuses, Requested status: A status in which a specific UE requests permission to use a specific slice from the network (5GS)

Allowed status: A status in which the use of a specific slice is allowed for a specific UE by the network (5GS)

Active status: A status in which the UE is actually using the allowed slice. The active status may be expressed as an in-use status.

Inactive status: A status in which the UE is not currently using the allowed slice The status for each slice should be simultaneously managed by the UE and one or more NFs in the network that manages the status of the UE, and the corresponding NF may be, for example, the AMF.

If the UE establishes at least one PDU session for an allowed slice, the slice may be considered in the active status. If the IE does not establish a PDU session for an allowed slice, or if all PDU sessions are released, the slice may be considered in the inactive status.

If a PDU session is not created (established) for a time set in a timer, for example, the above-mentioned slice duration timer, configured for an active slice, the UE or the network may change the slice to the inactive status. The timer may be configured so that the network transmits it to the UE through a NAS message. The UE may explicitly transmit a request to change the status of a specific slice from active to inactive to the network (5GS). The network (5GS) may explicitly transmit a command to change the status of a specific slice from inactive to active to the UE.

If an inactive slice is not changed to an active slice during the configured timer, the UE or the network (5GS) may exclude the slice from allowed slices. The timer may be configured so that the network (5GS) transmits it to the UE through a NAS message. The UE may explicitly transmit a message to the network (5GS) to inform that the status of a specific slice is out of permission. The network (5GS) may explicitly transmit a command for excluding a specific slice from allowed slices to the UE.

If the network (5GS) applies a quota limit (the number of simultaneous access UEs, the number of concurrently established sessions, the maximum transfer rate for each slice, etc.) to the slice, the detailed status of the slice may be considered. An example of applying such a quota limit is as follows.

If the quota limit of the network slice is based on the allowed slice, the quota limit is applied based on the number of UEs that are allowed to use the slice.

if the quota limit of the network slice is based on the active slice, the quota limit is applied based on the number of UEs of the active slice, that is, the slice in use.

In the disclosure, the value of the above-described timer may be differentially applied depending on user and service characteristics and may be contained in a part of subscription information or policy. In case of being contained in the subscription information, the corresponding information may be transmitted from the UDM to an NF that controls the slice. In case of being contained in the policy, the corresponding information may be transmitted from the PCF to an NF that controls the slice. For example, by configuring the value of the timer to be long for a subscriber whose service quality is important or with high priority/grade, the corresponding slice can be maintained in the allowed/active status for a long time. In the disclosure, the NF that controls the slice is an NF that determines the parameters delivered to the UE in accordance with the policy or subscription information and manages the slice status (allowed, requested, active, inactive, etc.) for the UE. In the 5G system, such an NF may be the AMF or the SMF.

Figure 8:
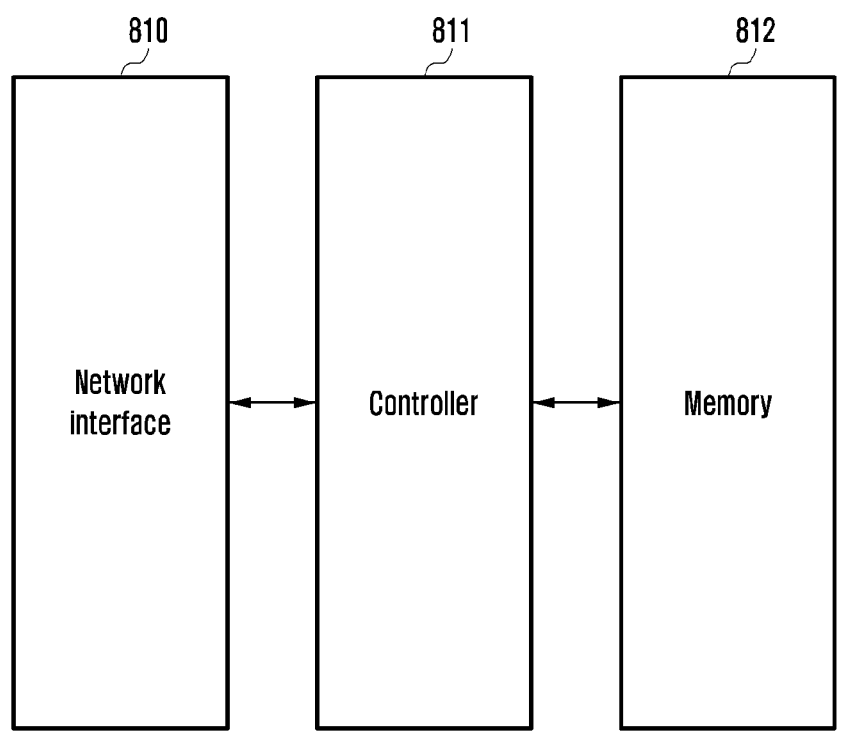
FIG. 8 is an internal functional block diagram of an NF according to the disclosure.

FIG. 8 is an internal functional block diagram of an NF according to the disclosure.

Before the description with reference to FIG. 8, the NF 300 may include the AMF 131, the SMF 132, and the UPF 133 as described above. In addition, the NF 300 may include other network entities or network instances such as the NSSF 134, the NFR 153, the SCP 157, the PCF 154, and the UDM 155. In another example, the NF 300 may be a separate network entity or instance not mentioned above.

With reference to FIG. 8, a network interface 810 may communicate with other network entities and/or instances in the core network. For example, if the NF 300 is the AMF 131, it may perform communication with the SMF 132, the UPF 133, the NSSF 134, the NFR 153, the PCF 154, the UDM 155, and/or the SCP 157. In another example, if the NF 300 is the SMF 132, it may perform communication with the AMF 131, the UPF 133, the NSSF 134, the NFR 153, the PCF 154, the UDM 155, and/or the SCP 157. In still another example, if the NF 300 is the NSSF 134, it may perform communication with the AMF 131, the UPF 133, the SMF 132, the NFR 153, the PCF 154, the UDM 155, and/or the SCP 157. Similarly, if the NF 300 is one specific network entity, it may perform communication with another entity in the core network.

A controller 811 may be implemented as at least one processor and/or a program driven by the processor for performing the operations of the NF. For example, if the NF 300 is the AMF 131, the controller 811 may perform the above-described operations of the AMF 131. In another example, if the NF 300 is the NSSF 134, the controller 811 may perform the above-described operations of the NSSF 134. Similarly, in case of any other network entity, the controller 811 may perform the control necessary for the above-described operations.

A memory 812 may store a program and various kinds of control information required for the controller 811 and may also store each information described in the disclosure. For example, if the NF 300 is the AMF 131, the memory 812 may store the above-described information received by the AMF 131 or received from an external entity. In another example, if the NF 300 is the NSSF 134, the memory 812 may store the above-described control information required for the NSSF 134 and/or received information. Similarly, in case of any other network entity, the memory 812 may store information necessary for the above-described operations.

The methods according to claims or embodiments described in the disclosure may be implemented by hardware, software, or a combination of hardware and software.

In case of implementation using software, a computer-readable storage medium for storing one or more programs (software modules) may be provided as hardware. One or more programs stored in the computer-readable storage medium are configured for execution by one or more processors in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc ROM, digital versatile discs (DVDs) or other optical storage devices, and a magnetic cassette. Alternatively, the programs may be stored in a memory combining part or all of the above recording media. A plurality of memories may be equipped.

In addition, the programs may be stored in an attachable storage device accessible via a communication network formed of Internet, Intranet, local area network (LAN), wide area network (WAN), or storage area network (SAN) alone or in combination. This storage device may access an apparatus performing embodiments of the disclosure through an external port. In addition, a separate storage device in the communication network may access an apparatus performing embodiments of the disclosure.

In the above-described embodiments, components or elements have been expressed as a singular or plural form. It should be understood, however, that such singular or plural representations are selected appropriately according to situations presented for the convenience of description, and the disclosure is not limited to the singular or plural form. Even expressed in a singular form, a component or element may be construed as a plurality of components or elements, and vice versa.

While the disclosure has been particularly shown and described with reference to exemplary embodiments thereof, it will be understood by those skilled in the art that various changes in form and details may be made therein without departing from the scope of the subject matter as defined by the appended claims.

The disclosure may be used for access and control of the UE when at least a part of the core network in the wireless communication system is constructed with a network slice.

The invention claimed is:

1. A method for managing a network (NW) slice by a first network function in a wireless communication system, the method comprising:
   receiving, from at least one second network function associated with the NW slice, a network slice selection assistance information (NSSAI) availability update message, wherein the NSSAI availability update message includes a capacity parameter of the NW slice;
   storing information included in the NSSAI availability update message;
   transmitting, to the second network function, a response message to the NSSAI availability update message;

transmitting, to the second network function, a message requesting changed information in case that a status or a configuration of the second network function is changed;

receiving, from the second network function, a network slice selection request message;

performing a selection of a NW slice based on the capacity parameter of the NW slice; and transmitting, to the second network function, a NW slice selection response message including NW slice information.

2. The method of claim 1, wherein the NSSAI availability update message includes at least one of a type of the second network function, a tracking area indicator (TAI) of the second network function, single network slice selection assistance information (S-NSSAI) list of a network slice associated with the second network function, or capacity information of a S-NSSAI associated with the second network function.

3. The method of claim 2, wherein the capacity parameter of the NW slice included in the capacity information of the S-NSSAI includes at least one of a maximum number of terminals supportable by the NW slice, a maximum number of sessions supportable by the NW slice, a maximum number of Internet protocol (IP) flows supportable by the NW slice, a maximum number of quality of service (QOS) flows supportable by the NW slice, or a maximum number of guaranteed bit rate (GBR) flows supportable by the NW slice.

4. The method of claim 1, wherein the message requesting the changed information is a subscribe message for a status change of the second network function or a reporting request message for a specific event.

5. The method of claim 4, wherein the status change is associated with at least one of a parameter for capacity of the NW slice, a current status of the NW slice, or a current usage of the NW slice.

6. The method of claim 5, wherein the current status of the NW slice includes at least one of a number of subscribers, terminals, or users currently accessing the NW slice, a number of subscribers, terminals, or users registered in the NW slice, a number of PDU sessions supported by the NW slice, a number of IP flows supported by the NW slice, a number of QoS flows supported by the NW slice, or a number of GBR flows supported by the NW slice.

7. The method of claim 5, wherein the current usage of the NW slice includes at least one of a ratio of a number of subscribers, terminals, or users currently accessing the NW slice to a maximum number of subscribers, terminals, or users supportable by the NW slice, a ratio of a number of PDU sessions supported by the NW slice to a maximum number of sessions supportable by the NW slice, a ratio of a number of IP flows supported by the NW slice to a maximum number of IP flows supportable by the NW slice, a ratio of a number of QoS flows supported by the NW slice to a maximum number of QoS flows supportable by the NW slice, or a ratio of a number of GBR flows supported by the NW slice to a maximum number of GBR flows supportable by the NW slice.

8. The method of claim 1, further comprising:
updating the stored information included in the NSSAI availability update message in case that a network function status change notification message is received from the second network function in response to the message requesting the changed information.

9. A first network function for managing a network (NW) slice in a wireless communication system, the first network function comprising:
a network interface communicating with other network functions in the wireless communication system;
a memory storing information about the NW slice; and
at least one processor configured to:
receive, from at least one second network function associated with the NW slice, a network slice selection assistance information (NSSAI) availability update message, wherein the NSSAI availability update message includes a capacity parameter of the NW slice,
store, in the memory, information included in the NSSAI availability update message,
transmit, to the second network function, a response message to the NSSAI availability update message,
transmit, to the second network function, a message requesting changed information in case that a status or a configuration of the second network function is changed,
receive, from the second network function, a NW slice selection request message,
perform a selection of a NW slice based on the capacity parameter of the NW slice, and
transmit, to the second network function, a NW slice selection response message including NW slice information.

10. The first network function of claim 9, wherein the NSSAI availability update message includes at least one of a type of the second network function, a tracking area indicator (TAI) of the second network function, a single network slice selection assistance information (S-NSSAI) list of a network slice associated with the second network function, or capacity information of a S-NSSAI associated with the second network function.

11. The first network function of claim 10, wherein the capacity parameter of the NW slice included in the capacity information of the S- NSSAI includes at least one of a maximum number of terminals supportable by the NW slice, a maximum number of sessions supportable by the NW slice, a maximum number of Internet protocol (IP) flows supportable by the NW slice, a maximum number of quality of service (QOS) flows supportable by the NW slice, or a maximum number of guaranteed bit rate (GBR) flows supportable by the NW slice.

12. The first network function of claim 9, wherein the message requesting the changed information is a subscribe message for a status change of the second network function or a reporting request message for a specific event.

13. The first network function of claim 12, wherein the status change is associated with at least one of a parameter for capacity of the NW slice, a current status of the NW slice, or a current usage of the NW slice.

14. The first network function of claim 13, wherein the current status of the NW slice includes at least one of a number of subscribers, terminals, or users currently accessing the NW slice, a number of subscribers, terminals, or users registered in the NW slice, a number of PDU sessions supported by the NW slice, a number of IP flows supported by the NW slice, a number of QoS flows supported by the NW slice, or a number of GBR flows supported by the NW slice, and wherein the current usage of the NW slice includes at least one of a ratio of the number of subscribers, terminals, or users currently accessing the NW slice to a maximum number of subscribers, terminals, or users supportable by the NW slice, a ratio of the number of PDU sessions supported by the NW slice to a maximum number of sessions supportable by the NW slice, a ratio of the number of IP flows supported by the NW slice to a maximum number of IP flows supportable by the NW slice, a ratio of the number of QoS flows supported by the NW slice to a maximum number of QoS flows supportable by the NW slice, or a ratio of the number of GBR flows supported by the NW slice to a maximum number of GBR flows supportable by the NW slice.

15. The first network function of claim 9, wherein the processor is configured to:
  update the information included in the NSSAI availability update message and stored in the memory in case that a network function status change notification message is received from the second network function in response to the message requesting the changed information.

* * * * *